United States Patent
Ozawa et al.

(10) Patent No.: US 8,805,976 B2
(45) Date of Patent: Aug. 12, 2014

(54) NETWORK SYSTEM, NETWORK MANAGEMENT SERVER, AND CONFIGURATION SCHEDULING METHOD, USING SUMMED PROCESSING TIME

(75) Inventors: Yoji Ozawa, Kokubunji (JP); Kazuma Yumoto, Fuchu (JP); Tatsuhiko Miyata, Inagi (JP); Eri Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1274 days.

(21) Appl. No.: 12/637,908

(22) Filed: Dec. 15, 2009

(65) Prior Publication Data

US 2010/0153532 A1   Jun. 17, 2010

(51) Int. Cl.
| | |
|---|---|
| *G06F 15/173* | (2006.01) |
| *G06F 15/177* | (2006.01) |
| *H04L 12/24* | (2006.01) |
| *H04L 12/46* | (2006.01) |

(52) U.S. Cl.
CPC ........ *H04L 41/0813* (2013.01); *H04L 12/4641* (2013.01)
USPC .......................................... 709/221; 709/223

(58) Field of Classification Search
CPC ............ H04L 41/0813; H04L 12/4641; H04L 41/0803; H04L 41/0806
USPC .................................................. 709/220–229
See application file for complete search history.

(56) References Cited

U.S. PATENT DOCUMENTS

| | | | | |
|---|---|---|---|---|
| 7,516,294 | B2 * | 4/2009 | Tomita ........................... | 711/173 |
| 7,711,947 | B2 * | 5/2010 | Smith et al. .................... | 713/100 |
| 7,730,183 | B2 * | 6/2010 | Brown et al. ................. | 709/226 |
| 7,814,192 | B2 * | 10/2010 | Kumar .......................... | 709/223 |
| 7,987,228 | B2 * | 7/2011 | McKeown et al. ............ | 709/202 |
| 2002/0091859 | A1 * | 7/2002 | Tuomenoksa et al. ........ | 709/245 |
| 2002/0099937 | A1 * | 7/2002 | Tuomenoksa ................. | 713/153 |
| 2003/0079198 | A1 * | 4/2003 | Yamamoto ...................... | 716/13 |
| 2003/0140131 | A1 * | 7/2003 | Chandrashekhar et al. .. | 709/223 |
| 2005/0160156 | A1 * | 7/2005 | Kurosawa ..................... | 709/220 |
| 2005/0193103 | A1 * | 9/2005 | Drabik .......................... | 709/221 |
| 2006/0153496 | A1 * | 7/2006 | Tanobe et al. ................... | 385/24 |
| 2006/0168279 | A1 * | 7/2006 | Lee et al. ...................... | 709/230 |
| 2007/0226630 | A1 * | 9/2007 | Farid et al. .................... | 715/734 |
| 2007/0230457 | A1 * | 10/2007 | Kodera et al. ................. | 370/389 |
| 2009/0077235 | A1 * | 3/2009 | Podila .......................... | 709/226 |
| 2009/0161679 | A1 * | 6/2009 | Yang et al. ............... | 370/395.53 |
| 2009/0228541 | A1 * | 9/2009 | Barsness et al. .............. | 709/201 |
| 2010/0142410 | A1 * | 6/2010 | Huynh Van et al. .......... | 370/255 |

FOREIGN PATENT DOCUMENTS

JP    2008-131247    6/2008

* cited by examiner

*Primary Examiner* — Patrice Winder
*Assistant Examiner* — Julian Chang
(74) *Attorney, Agent, or Firm* — Antonelli, Terry, Stout & Kraus, LLP.

(57) ABSTRACT

A reservation processing is executed according to the configuration request to VPN and network device to inform a user's terminal of scheduled period. In a network system including plural network devices for transmitting a packet and a management server, plural logical networks (VPNs) are formed on the plural network devices. The management server receives a configuration request including configuration data for VPN and configuration desired time from a user's terminal to generate the configuration data for the network device from the configuration data for the VPN. The management server refers to a configuration reservation table to confirm whether free time is available in the same period about all target network devices. If free time is available, the management server makes configuration reservation and configures the target network device in the reserved time. The management server notifies the user's terminal of the reserved time.

12 Claims, 15 Drawing Sheets

FIG. 4

| PERIOD | TARGET NETWORK DEVICE | | | | |
|---|---|---|---|---|---|
| | NETWORK DEVICE 1 | NETWORK DEVICE 2 | NETWORK DEVICE 3 | NETWORK DEVICE 4 | NETWORK DEVICE 5 |
| 2008/09/05 01:00 ~2008/09/05 01:10 | RESERVATION 1 (VPN1) | RESERVATION 1 (VPN1) | RESERVATION 1 (VPN1) | RESERVATION 2 (VPN3) | RESERVATION 2 (VPN3) |
| 2008/09/05 01:10 ~2008/09/05 01:20 | — | RESERVATION 3 (NETWORK DEVICE) | — | RESERVATION 3 (NETWORK DEVICE) | RESERVATION 3 (NETWORK DEVICE) |
| 2008/09/05 01:20 ~2008/09/05 01:30 | RESERVATION 4 (VPN2) | RESERVATION 4 (VPN2) | RESERVATION 5 (VPN5) | RESERVATION 5 (VPN5) | — |
| .. | .. | .. | .. | .. | .. |

| TARGET NETWORK DEVICE ID | CONFIGURATION DATA | PROCESSING TIME |
|---|---|---|
| 1 | ADD USER VLAN | 180 |
| 1 | ADD ACL (※1) | 80 |
| 2 | DELETE ACL | 60 |
| 2 | MODIFY QoS (※2) | 70 |
| ⋮ | ⋮ | ⋮ |

※1 ACL (ACCESS CONTROL LIST)
※2 QoS (QUALITY OF SERVICE)

FIG. 6

| REQUEST ID 5241 | RECEIPT TIME 5242 | VPN CONFIGURATION DATA 5243 | CONFIGURATION DESIRED TIME 5244 | STATUS 5245 | TARGET VPN ID 5246 | RESERVATION ID 5247 | DELETED FLAG 5248 | PROCESSED FLAG 5249 |
|---|---|---|---|---|---|---|---|---|
| 1 | 2008/08/01 03:00:11 | ADD ACL ADD USER VLAN | 2008/09/05 01:00 ~2008/09/05 01:30 | RESERVED | 1 | RESERVATION 1 | ON | ON |
| 2 | 2008/08/01 04:00:02 | ADD USER VLAN | 2008/08/05 00:00 ~2008/08/05 01:00 | CONFIGURED | 10 | — | OFF | OFF |
| 3 | 2008/08/02 01:00:00 | MODIFY QoS | 2008/09/15 01:00 ~2008/09/15 01:30 | RESERVED | 3 | RESERVATION 2 | OFF | OFF |
| .. | .. | .. | .. | .. | .. | .. | .. | .. |

FIG. 7

VPN CONFIGURATION REQUEST

CONFIGURE VPN1

CONFIGURATION DESIRED TIME: 2010/2/1 1:00 ~ 2010/2/1 2:00

ACL CONFIGURATION LIST

| ID | TARGET CIRCUIT | ACL CONTENT |
|---|---|---|
| 1 | CIRCUIT 1 | (TCP, dst port=22),deny |
| : | : | : |

[ ADD ] [ DELETE ] [ EDIT ]

QoS CONFIGURATION LIST

| ID | TARGET CIRCUIT | QoS CONTENT |
|---|---|---|
| 1 | CIRCUIT 1 | (TCP, dst IP=192.168.0.0/24), MOST PREFERENTIALLY |
| : | : | : |

[ ADD ] [ DELETE ] [ EDIT ]

VLAN CONFIGURATION LIST

| ID | VLAN ID | VLAN NAME | TARGET CIRCUIT |
|---|---|---|---|
| 1 | 10 | VLAN10 | CIRCUIT 1, CIRCUIT 2 |
| : | : | : | : |

[ ADD ] [ DELETE ] [ EDIT ]

[ CONFIGURATION REQUEST ] [ CANCEL ]

FIG. 8

NETWORK DEVICE CONFIGURATION REQUEST

CONFIGURATION DESIRED TIME: 2010/10/1 1:00 ~ 2010/10/1 2:00

CONFIGURATION DATA

| ID | TARGET NETWORK DEVICE | CONFIGURATION DATA |
|---|---|---|
| 1 | NETWORK DEVICE 1 | ADD INTERNAL VLAN (VLAN ID=10) |
| 2 | NETWORK DEVICE 2 | SET PORT REDUNDANCY (PORT 1, 2) |
| : | : | : |

[ADD] [DELETE] [EDIT]

[CONFIGURATION REQUEST] [CANCEL]

FIG. 13

| MESSAGE | TRANSMISSION SOURCE | DESTINATION | CONTENT | |
|---|---|---|---|---|
| REQUEST FOR VPN CONFIGURATION | USER'S TERMINAL | MANAGEMENT SERVER | ·TARGET VPN ID<br>·VPN CONFIGURATION DATA<br>·CONFIGURATION DESIRED TIME | (S101) |
| SCHEDULED PERIOD | MANAGEMENT SERVER | USER'S TERMINAL | ·RESERVATION RESULT<br>·SCHEDULED PERIOD | (S104) |
| CONFIGURATION | MANAGEMENT SERVER | NETWORK DEVICE | ·CONFIGURATION DATA | (S105) |
| CONFIGURATION RESULT | NETWORK DEVICE | MANAGEMENT SERVER | ·CONFIGURATION RESULT INFORMATION | (S106) |
| NOTIFICATION OF COMPLETION OF CONFIGURATION | MANAGEMENT SERVER | USER'S TERMINAL | ·CONFIGURATION RESULT INFORMATION | (S108) |

FIG. 16

| MESSAGE | TRANSMISSION SOURCE | DESTINATION | CONTENT | |
|---|---|---|---|---|
| NETWORK DWVICE CONFIGURATION REQUEST | OPERATOR'S TERMINAL | MANAGEMENT SERVER | ·ID OF TARGET NETWORK DEVICE<br>·NETWORK DEVICE CONFIGURATION DATA<br>·CONFIGURATION DESIRED TIME | (S301) |
| CONFIGURATION COMPLETION SCHEDULE TIME | MANAGEMENT SERVER | OPERATOR'S TERMINAL | ·RESERVATION RESULT<br>·SCHEDULED PERIOD | (S305) |
| CONFIGURATION | MANAGEMENT SERVER | NETWORK DEVICE | ·CONFIGURATION DATA | (S306) |
| CONFIGURATION RESULT | NETWORK DEVICE | MANAGEMENT SERVER | ·CONFIGURATION RESULT INFORMATION | (S307) |
| NOTIFICATION OF COMPLETION OF CONFIGURATION | MANAGEMENT SERVER | OPERATOR'S TERMINAL | ·CONFIGURATION RESULT INFORMATION | (S309) |

NETWORK SYSTEM, NETWORK MANAGEMENT SERVER, AND CONFIGURATION SCHEDULING METHOD, USING SUMMED PROCESSING TIME

CLAIM OF PRIORITY

The present application claims priority from Japanese patent application JP 2008-318342 filed on Dec. 15, 2008, the content of which is hereby incorporated by reference into this application.

FIELD OF THE INVENTION

The present invention relates to a network system, a management server, and a configuration scheduling method and, in particular, to a network system, a management server, and a configuration scheduling method for scheduling configuration for a physical network apparatus (hereinafter referred to as network device) and a logical network in a network system in which a logical network is formed on a physical network.

BACKGROUND OF THE INVENTION

In recent years, a corporation has vigorously used a virtual private network (VPN) to connect bases of operations with each other through an independent network. The VPN is logical networks, each being separated from each other, and formed on a physical network.

A communication carrier providing service using VPN (VAN service) provides a variety of network functions such as, for example, access control list (ACL) and quality of service (QoS) which enable a fine flow control, and a user virtual local area network (user VLAN) which is a function to group communicable circuits by ID in a VLAN tag, with which a user provides a frame. An end user can directly request setting (request for setting the VPN, for example) to change setting of these functions. Providing a user with a user interface for setting the VPN can increase the number of requests for setting the VPN.

Request for configuration of a network system providing the VPN service includes the following types, for example. First, it is the abovementioned request for setting the VPN, for example. This is setting in unit of VPN and does not affect other VPNs. Items that can be set are limited to items related to the VPN. Mainly the end user makes a request for setting the VPN. A carrier operator who is requested to set the VPN in writing by the end user can make a request for setting the VPN.

Secondly, it is a request for setting a physical network device, for example. This is a direct request for configuration of the physical network device providing the VPN service and a request for configuration of all the items of the network device, for example. Since plural VPNs are generally formed on the network device, the setting of the network device can change the relationship between the VPN and the network device. The term "relationship" refers to the relationship between the unit of a logical network of the VPN and each physical network device forming the VPN, for example. The request for setting the network device is triggered by increase or decrease in apparatus and failure therein.

The following describes the flow of the processing for setting the VPN and the network device.

The request for configuring the VPN is changed to configuration of plural physical network devices in which the VPN is actually formed. The contents of the request for setting the VPN are set to plural target network devices at the same time not to cause the mismatch of setting as the VPN. In general, a content can be only sequentially set to the network device, so that the right to set all the target network devices (the right to enable the configuration to be modified), for example, is previously obtained and then the content is set.

For the request for setting the network device, as is the case with the request for setting the VPN, the right to set the target network device is previously obtained and at the same time a content is set to the target network device.

There is disclosed a method of scheduling for processing reservations for using a transmission line and a method of configuring a network device at the time of receiving the request for configuration (refer to JP-A-2008-131247, for example). According to the disclosure thereof, if the transmission line #1 is competitive with the transmission line #2, for example, and if both the reservations for using the transmission line request the use of the transmission line at the same time zone, a competitive control and a preferential control are performed between the two reservations.

SUMMARY OF THE INVENTION

If the technique disclosed in JP-A-2008-131247 is applied to setting for the VPN and the network device, the following problems occur.

One of the problems is that reservations for setting time are not taken into consideration. The technique disclosed in JP-A-2008-131247 relates to reservations for a transmission line. Since configuration data can be only sequentially set to the network device, if a large number of configuration requests are received, waiting time for setting may increase. For this reason, reservations for setting time to the network device may be required.

Another problem is that the setting of the target network device is changed until setting about the VPN is performed, which may not enable the requested setting about the VPN. When the request for setting the VPN is received, the target network device is identified, the configuration data for the target network device is generated to make configuration reservations. However, another setting may be performed to the network device before the generated configuration data is actually set to the network device according to configuration reservations, so that a relationship between the VPN and the network device may be changed. For example, the network device configuring VPN by receiving the VPN configuration request to make reservations for configuration may be different from the network device configuring the VPN at the time of actually configuring according to the configuration reservations. In this case, the target network device or a configuration in the network device is changed, so that setting related to the VPN is stopped and design needs to be made again. Hereinafter, the processing for identifying the target network device from the request for setting the VPN and the processing for creating the content set to the target network device are referred to as design (or reservation processing).

Thus, if re-generation occurs, the setting of the VPN requested in the reserved time is not performed. It is not clear until just before setting whether the re-generation occurs, so that the time for executing the setting cannot be previously calculated. Therefore, it is not clear for the end user when the configuration of the network device which the end user uses is changed, so that it can be difficult for the end user to form a plan for changing the network device.

The present invention has been made in view of the above problems and a first object thereof is to previously calculate time for finishing the setting of the VPN and the network device by reserving time for configuration of the VPN and the network device even if the network device is set before the setting related to the VPN is performed.

A second object of the present invention is to notify the user of a scheduled period by performing schedule so that setting related to the VPN is simultaneously made to a physical network device. A third object of the present invention is to automatically re-generate and re-reserve the reserved configuration request if a relationship between the VPN and the network device is changed, to reduce schedule of a large number of configuration requests and working load of re-generation of a carrier operator.

A network system includes plural transmission apparatuses for transmitting a packet and a management calculator (a management server) and a network is formed by the transmission apparatus.

Plural logical networks, each being separated from each other, are formed on the plural transmission apparatuses.

For example, the management calculator receives configuration request and configuration desired time for the logical network or configuration request and configuration desired time for the transmission apparatus from the operator terminal of the network system or the user's terminal of thereof, generates configuration data for the transmission apparatus from the configuration data for the logical network, refers to the reservation table of setting time for each transmission apparatus, confirms whether free time is available in the same period with respect to all the transmission apparatus to which setting is made, makes configuration reservation if free time is available in the setting time, and performs configuration of the target transmission apparatus in the reserved time.

For example, the management calculator receives configuration request for the logical network from the user's terminal of the network system, refers to corresponding information of a logical network and plural the transmission apparatuses related to the logical network to change the configuration data for the logical network to the configuration data for the transmission apparatus.

For example, the management calculator refers to the processing time information to calculate the processing time of the configuration data for the transmission apparatus created from the configuration data for the logical network or of the configuration data for the transmission apparatus requested from the operator terminal, refers to the configuration reservation table to determine whether free time for the calculated processing time is available, performs setting for the transmission apparatus to which setting is made and then updates processing time information based on the executed processing time.

For example, the management calculator makes the configuration reservation in a period shorter than the configuration desired time requested from the terminal and notifies the terminal of the configuration reservation as the scheduled period.

For example, the management calculator reserves the configuration request for the transmission apparatus requested from the operator terminal on the configuration reservation table, then updates corresponding information of the logical network changed by the setting for the transmission apparatus and plural the transmission apparatuses related to the logical network, generates a new configuration data for the transmission apparatus with respect to the reserved logical network according to the updated corresponding information, confirms whether free time is available in the same period with respect to all the target network device with reference to the reservation table for the setting time for each transmission apparatus, and makes configuration reservation if free time is available in the setting time.

For example, the management calculator stores the configuration desired time included in the configuration request to be requested, generates a new configuration data for the transmission apparatus if the configuration request for transmission apparatus is received from the operator terminal, confirms whether free time for the processing time is available in the same period in the stored configuration desired time with respect to all the transmission apparatus to which setting is made with reference to the reservation table for the setting time and makes configuration reservation if free time is available.

According to a first aspect of the present invention, a management server in a network system which has plural transmission apparatuses for transmitting a packet and forms a logical network including the transmission apparatus, the management server includes:

a relation information storage unit configured to previously store an identifier of a logical network and an identifier of one or plural transmission apparatuses forming the logical network with the identifiers corresponding to each other;

a configuration reservation information storage unit configured to store reservation information for each predetermined time zone and each of the plural transmission apparatuses, the reservation information indicating whether configuring the transmission apparatus is already reserved in a time zone or the configuration is not reserved in the time zone (or in a vacant state); and a processing unit; wherein the processing unit receives configuration request for a logical network including the identifier of the logical network from a user management terminal, executes a reservation processing including:

(a) obtaining the identifier of the corresponding one or plural transmission apparatuses with reference to the relation information storage unit based on the identifier of the logical network included in the configuration request; and (b) identifying a time zone in which corresponding reservation information indicates vacancy with respect to the obtained identifier of the transmission apparatus with reference to the configuration reservation information storage unit and setting the reservation information corresponding, to the time zone and the identifier of the transmission apparatus to a reserved state; and transmits a scheduled period notice including the identified time zone to the user management terminal.

According to a second aspect of the present invention, in a network system which has plural transmission apparatuses for transmitting a packet and a management server and forms a logical network including the transmission apparatus, the management server includes:

a relation information storage unit configured to previously store an identifier of a logical network and an identifier of one or plural transmission apparatuses forming the logical network with the identifiers corresponding to each other;

a configuration reservation information storage unit configured to store reservation information for each predetermined time zone and each of the plural transmission apparatuses, the reservation information indicating whether configuring the transmission apparatus is already reserved in a time zone or the configuration is not reserved in the time zone (or in a vacant state); and a processing unit; wherein the processing unit receives configuration request for a logical network including the identifier of the logical network from a user management terminal, executes a reservation processing including:

(a) obtaining the identifier of the corresponding one or plural transmission apparatuses with reference to the relation information storage unit based on the identifier of the logical network included in the configuration request; and (b) identifying a time zone in which corresponding reservation information indicates vacancy with respect to the obtained identifier of the transmission apparatus with reference to the configuration reservation information storage unit and setting the reservation information corresponding to the time zone and the identifier of the transmission apparatus to a reserved state; and transmits a scheduled period notice including the identified time zone to the user management terminal.

According to a third aspect of the present invention, in a configuration scheduling method for scheduling the setting of a logical network in a network system which has plural transmission apparatuses for transmitting a packet and a management server and forms a logical network including the transmission apparatus, the method includes the steps of:

a processing unit receiving configuration request for a logical network including an identifier of a logical network from a terminal;

the processing unit executing a reservation processing including: (a) obtaining the identifier of the corresponding one or plural transmission apparatuses with reference to the relation information storage unit previously storing an identifier of a logical network and an identifier of one or plural transmission apparatuses forming the logical network with the identifiers corresponding to each other based on the identifier of the logical network included in the configuration request; and (b) identifying a time zone in which corresponding reservation information indicates vacancy with respect to the obtained identifier of the transmission apparatus and setting the reservation information corresponding to the time zone and the identifier of the transmission apparatus to a reserved state with reference to a configuration reservation information storage unit for storing reservation information for each predetermined time zone and each of the plural transmission apparatuses, the reservation information indicating whether configuring to the transmission apparatus is already reserved in a time zone or the configuring is not reserved in the time zone (or in a vacant state); and the processing unit transmitting a scheduled period notice including the identified time zone to the terminal.

According to the present invention, it is enabled to previously calculate time for finishing the configuring of the VPN and the network device by reserving time for configuring to the VPN and the network device even if the network device is set before the configuring related to the VPN is performed.

Furthermore, according to the present invention, it is enabled to notify the user of a scheduled period by performing schedule so that setting related to the VPN is simultaneously made to a physical network device. Still furthermore, according to the present invention, it is enabled to automatically re-generate and re-reserve the reserved configuration request if a relationship between the VPN and the network device is changed, to reduce schedule of a large number of configuration requests and working load of re-generation of a carrier operator.

BRIEF DESCRIPTION OF THE DRAWINGS

FIG. 4 illustrates the configuration reservation table 522 according to the present embodiment;

FIG. 6 illustrates the VPN request table 524 according to the present embodiment;

FIG. 7 illustrates a user interface for inputting a VPN configuration data on the user's terminal 600 or the operator's terminal 700;

FIG. 8 illustrates a user interface for inputting an NW configuration data on the operator's terminal 700;

FIG. 13 is a table describing messages transmitted and received in the VPN configuration reservation and processing for configuring the network device according to the present embodiment;

FIG. 16 is a table describing messages transmitted and received in the network device configuration reservation, re-generation and re-reservation for VPN configuration reservation, and configuration to the network device according to the present embodiment.

DETAILED DESCRIPTION OF THE PREFERRED EMBODIMENTS

The present embodiment is described below with reference to the drawings.

[Network System]

Figure 1:
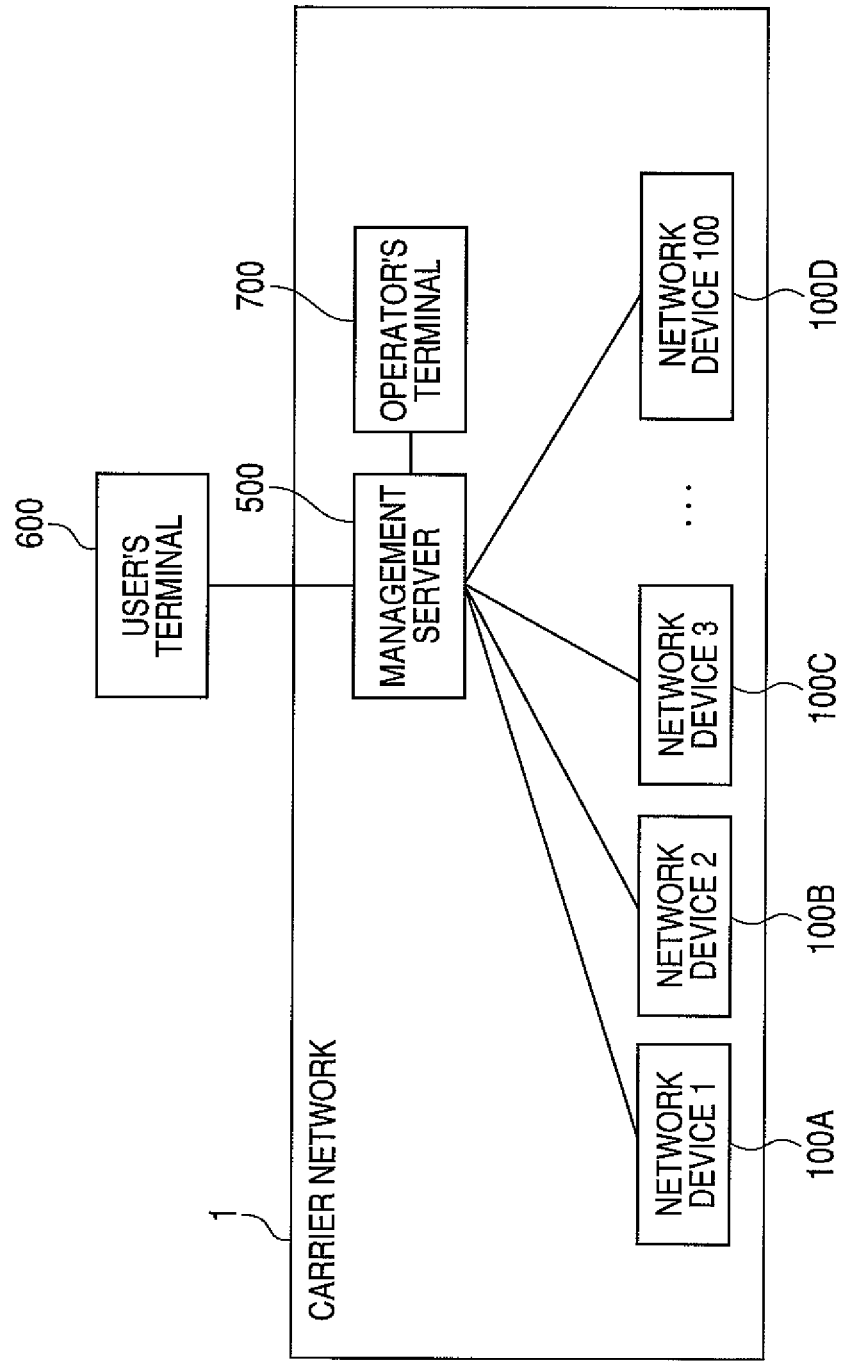
FIG. 1 illustrates a configuration of a network system according to the present embodiment.

FIG. 1 illustrates a configuration of a network system according to the present embodiment.

The network system according to the present embodiment includes, for example, network device (transmission apparatus) 100A to 100D, a management server 500, an operator's terminal (operator management terminal) 700, and a user's terminal 600. The network device 100A to 100D, the management server 500, and the operator's terminal 700 are included in a carrier network 1. The network device 100A to 100D can be generically named as "network device 100" in the following description. The management server 500 is a calculator for managing the carrier network 1. The management server 500 is described in detail later with reference to FIG. 2. The network device 100 is one which transmits information communicated in the network to the destination of the information and a switch, a router, or transmission apparatus, for example. The user's terminal 600 is placed at a base of an end user, for example, and connected to the management server 500 in the carrier network 1 through the Internet or a private line. The operator's terminal 700 is connected to the management server 500, for example. The number of the network device 100 can be appropriately increased independently of the example illustrated in FIG. 1. The plural management terminals for a user 600 may be provided.

Figure 2:
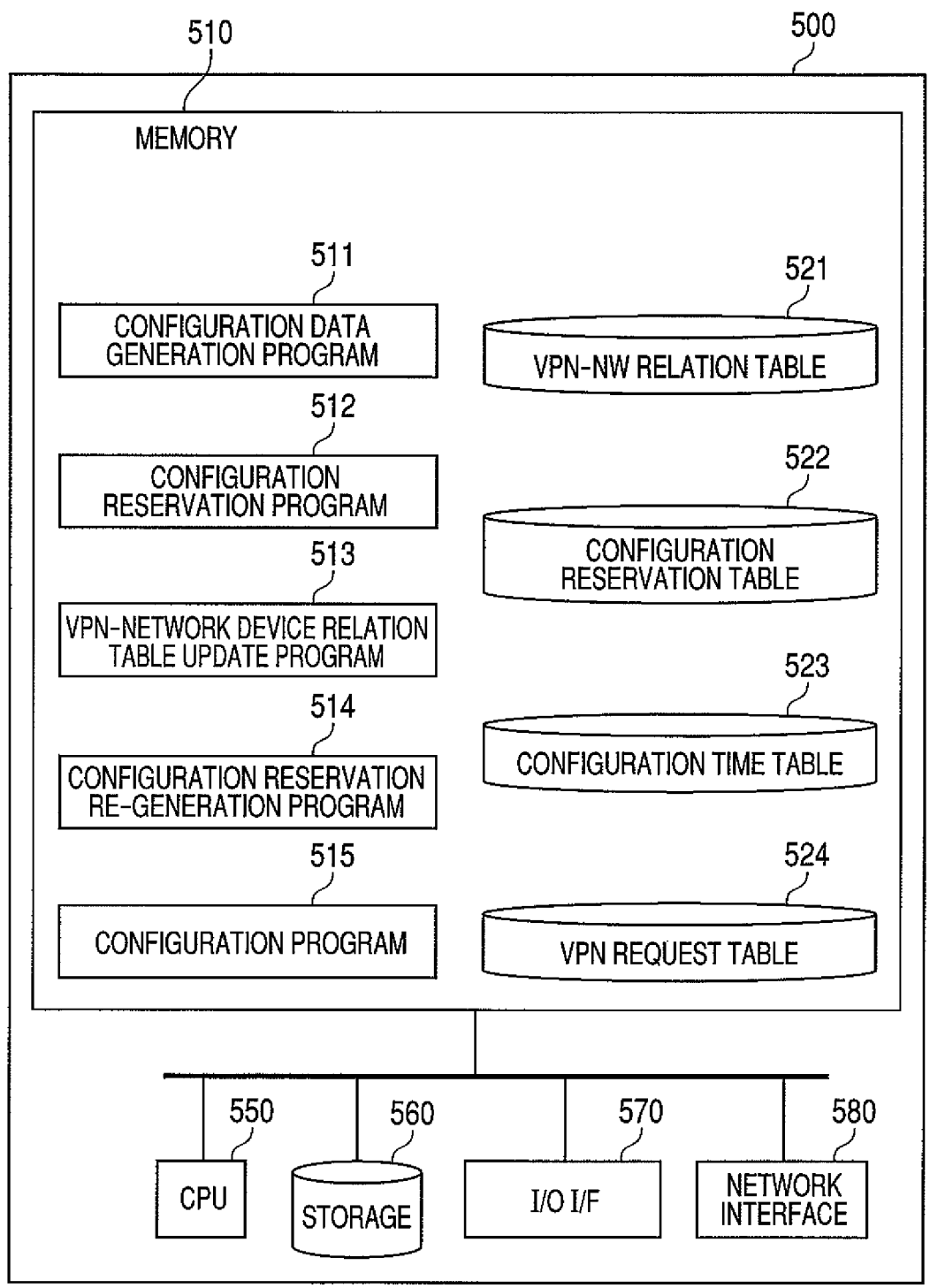
FIG. 2 is a block diagram of the management server 500 according to the present embodiment.

FIG. 2 is a block diagram of the management server 500 according to the present embodiment.

The management server 500 includes a memory 510, a processing unit (CPU) 550, a storage 560, an I/O interface 570, and a network interface 580, for example. The management server 500 connected to a network such as the carrier network 1 through the network interface 580. The management server 500 transmits and receives information to and from other apparatus (the network device 100, for example) connected to the network through the network interface 580.

The memory 510 stores configuration data generation program 511, a configuration reservation program 512, a configuration program 515, a VPN-NW device relation table (relation information storage unit) 521, a configuration reservation table (configuration reservation information storage unit) 522, a configuration time table (processing time storage unit) 523, and a VPN request table (configuration request information storage unit) 524, for example. The memory 510 may further store or omit a VPN-Network device relation table update program 513 and a re-generation program 514 for VPN configuration reservation, for example. Each program may be executed by the CPU 550.

The configuration data generation program 511 generates configuration data to the network device based on the VPN configuration request. The configuration reservation program 512 confirms setting free time of the network device 100 to which setting is made, if free time is available, configuration requested in the time is reserved (configuration reservation). The VPN-Network device relation table update program 513 updates the VPN-NW device relation table 521 according to the configuration request for the network device. When the configuration reservation program 512 is updated by the configuration request for the network device, the re-generation program 514 for VPN configuration reservation re-generates configuration reservations related to the existing VPN using information of the updated VPN-NW device relation table 521. The configuration program 515 sets the generated configuration data for the network device 100 (network device configuration data) to the network device 100.

The VPN-NW device relation table 521 manages corresponding information about the network device 100 related to each VPN. In general, there are the plural network devices 100 related to one VPN. The VPN-NW device relation table 521 is described in detail with reference to FIG. 3. The configuration reservation table 522 manages reservation information as to which VPN is set for each the network device 100 or which network device 100 is set. The configuration reservation table 522 is described in detail with reference to FIG. 4. The configuration time table 523 manages identification information of the network device 100 to which setting is made and processing time for each configuration data. The configuration time table 523 is described in detail with reference to FIG. 5. The VPN request table 524 manages VPN configuration requests received by the management server 500 and the state of each VPN configuration request. The VPN request table 524 is described in detail with reference to FIG. 6.

The CPU 550 is a processor for executing each program stored in the memory 510. The storage 560 is a device capable of storing programs and various data and can be formed by a HDD, for example. The I/O interface 570 is an interface for inputting and outputting data. The network interface 580 is an interface for transmitting and receiving information to and from other apparatus connected to the network.

Figure 3:
FIG. 3 illustrates the VPN-NW device relation table 521 according to the present embodiment.

FIG. 3 illustrates the VPN-NW device relation table 521 according to the present embodiment.

The VPN-NW device relation table 521 includes one or plural combinations of a VP ID 5212 and an network device ID 5213 corresponding to a period 5211. The correspondence of the VP ID 5212 with the network device ID 5213 represents that the VPN indicated by the VP ID 5212 is formed by the network device 100 indicated by the network device ID 5213.

The period 5211 represents a period during which the network device 100 (forming the VPN) corresponding to the VPN indicated by the VPN ID 5212 is the network device indicated by the network device ID 5213 in the same entry. The VP ID 5212 is appropriate identification information for identifying a VPN. The network device ID 5213 is identification information indicating the network device 100 corresponding to the VPN ID 5212 in the same entry. In general, plural network devices correspond to one VPN, so that the network device ID 5213 may include one or plural pieces of identification information.

In the example illustrated in FIG. 3, the first line of the VPN-NW device relation table 521 shows that the network device corresponding to VPN ID 1 is the network device 100 indicated by the network device ID 1, 2, and 4 from 2008/09/01 18:00 to 2008/09/05 01:20. The period 5211 and each information of the VPN ID 5212 and the network device ID 5213 in the VPN-NW device relation table 521 can be previously stored.

FIG. 4 illustrates the configuration reservation table 522 according to the present embodiment.

The configuration reservation table 522 includes information on the target network device 5222 for each period 5221, for example. The period 5221 is a predetermined specific period (time zone) and is information for managing whether reservation is set to each network device 100 in each period. The information on the target network device 5222 includes information about whether reservation is set to each network device 100 and reservation is set to which VPN or which network device. The information on the target network device 5222 includes information identifying reservation for each network device 100 (reservation id) and information identifying VPN (VPN ID) or information indicating the setting of the network device, corresponding to the period 5221, for example. The reservation id is stored, for example, to indicate that reservation has been made. On the other hand, the reservation id is not stored to indicate a vacant state. Alternatively, another appropriate method may be used to obtain information about whether reservation is set.

In the example illustrated in FIG. 4, the first line of the configuration reservation table 522 shows that the reservation id 1 for setting related to the VPN ID 1 is stored in the network device 100 of the network device IDs 1, 2, and 3 and the reservation id 2 for setting related to the VPN ID 3 is stored in the network device 100 of the network device IDs 4 and 5.

Figure 5:
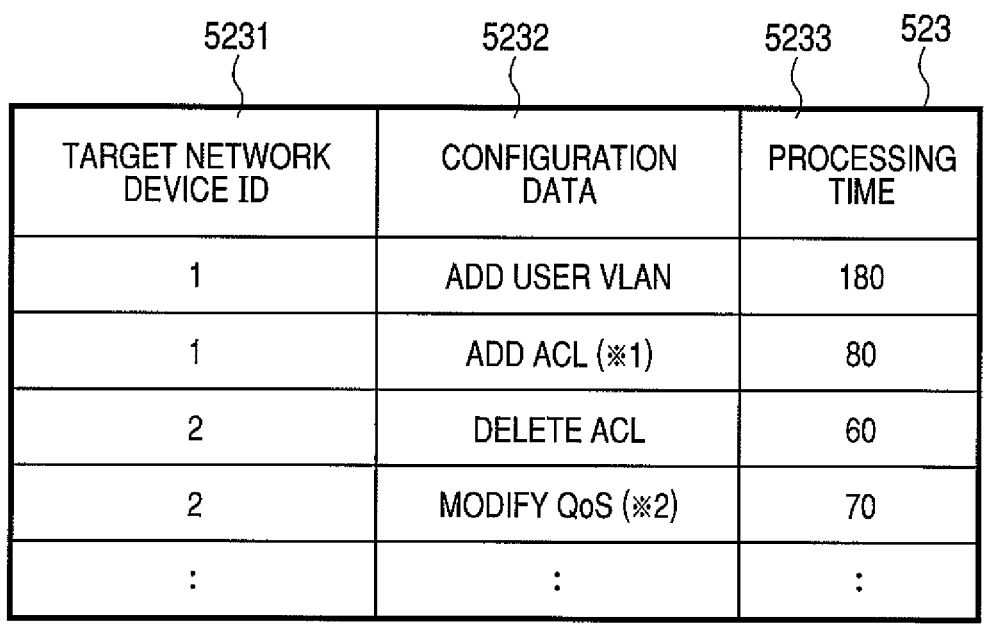
FIG. 5 illustrates the configuration time table 523 according to the present embodiment.

FIG. 5 illustrates the configuration time table 523 according to the present embodiment.

The configuration time table 523 includes ID of a target network device 5231, configuration data 5232, and a processing time (sec) 5233, for example. The ID of the target network device 5231 is unique identification information for identifying the network device 100 to which setting is made. The configuration data 5232 is the minimum unit of a setting item set to the network device 100, for example. The configuration data 5232 is addition, deletion, and modification of ACL, addition, deletion, and modification of QoS, or addition, deletion, and change of user VLAN, for example. An identifier, for example, for identifying those configuration data can be stored in the configuration time table 523. The configuration data 5232 is not limited to the minimum unit of a setting item, but may use an appropriate unit. Contents set to the network device 100 can be represented by combination of one or plural pieces of the configuration data 5232. The configuration data 5232 may be a setting item of a content set to the network device 100 corresponding to the VPN configuration data based on the VPN configuration request described later.

The processing time (sec) 5233 is an estimated value of processing time required to set the configuration data 5232 to the network device 100 indicated by the ID of the target network device 5231 in the same entry. An appropriate default value in an initial state, for example may be set as the processing time (sec) 5233. Actual processing time is measured in the operation of the system and the processing time (sec) 5233 may be updated based on the measured processing time. As a method of updating, there may be used an appropriate method such as, for example, a method in which the processing time (sec) 5233 is updated to the average of the measured time. In the example illustrated in FIG. 5, the first line of configuration time table 523 shows that processing time for which VLAN is added to the network device 100 of the network device ID 1 is 180 sec.

FIG. 6 illustrates the VPN request table 524 according to the present embodiment.

The VPN request table 524 includes a request ID 5241, a receipt time 5242, a VPN configuration data 5243, a configuration desired time 5244, a state 5245, a target VPN id 5246, a reservation id 5247, a deleted flag 5248, and a processed flag 5249, for example. The request ID 5241 is unique identification information for identifying the VPN configuration request which the management server 500 receives from the user's terminal 600. The receipt time 5242 is a time when the management server 500 receives the VPN configuration request. The VPN configuration data 5243 is a content set to the VPN. The configuration, desired time 5244 is a configuration desired time specified by an end user or a carrier operator. The state 5245 is a state where the VPN configuration request is processed. Data which can be obtained in the state 5245 is "reserved" and "having been set," for example. The target VPN ID 5246 is identification information of the VPN to which setting is made. The reservation ID 5247 is information for discriminating reservation stored in the configuration reservation table 522. The reservation ID 5247 does not need to have a specific value if the VPN has been already set to the network device 100.

The deleted flag 5248 indicates whether the request is the VPN configuration request deleted from the configuration reservation table 522. If the request is the VPN configuration request deleted from the configuration reservation table 522, for example, a flag is set (ON). As an initial state, there may be created a state where a flag is not set (OFF). The processed flag 5249 indicates whether the VPN configuration request is subjected to re-generate or re-reservation processing. If the VPN configuration request is subjected to re-generation or re-reservation processing, for example, a flag is set (ON). As an initial state, there may be created a state where a flag is not set (OFF).

FIG. 7 illustrates a user interface for inputting a VPN configuration data on the user's terminal 600 or the operator's terminal 700.

The user's terminal 600 or the operator's terminal 700 inputs VPN ID, configuration desired time, and configuration data of VPN, for example, based on user operation. The configuration data of VPN include addition, deletion, and modification of ACL, addition, deletion, and modification of QoS, and addition, deletion, and change of user VLAN. The example illustrated in FIG. 7 makes the following requests for setting the VPN of VPN ID 1 during a configuration desired time of 2010/02/01 1:00 to 2010/02/01 2:00: ACL setting 1 in which a flow of a destination port number 22 is cut off on a circuit 1 by transmission control protocol (TCP); QoS setting in which a flow of a destination IP address space 192.168.0.0/24 is most preferentially transferred to the circuit 1 by TCP; and VLAN setting in which VLAN (VLAN ID 10 and VLAN name of VLAN 10) are allocated to circuits 1 and 2.

FIG. 8 illustrates a user interface for inputting an NW configuration data on the operator's terminal 700.

The operator's terminal 700 inputs configuration desired time and ID and configuration data of the target network device based on user operation, for example. The example illustrated in FIG. 8 shows that the internal VLAN (VLAN ID=10) is added to the network device 100 of network device ID 1 and port redundancy setting (ports 1 and 2) is requested to the network device 100 of network device ID 2 during a configuration desired time of 2010/10/01 1:00 to 2010/10/01 2:00.

Figure 9:
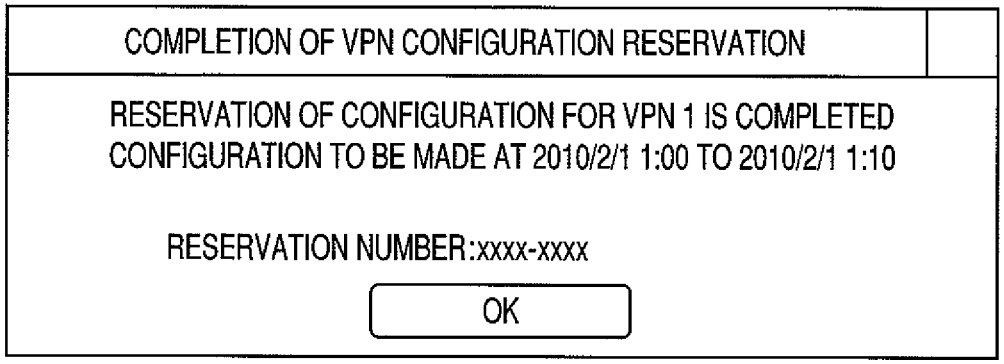
FIG. 9 illustrates a user interface for displaying the VPN configuration reservation completion on the user's terminal 600 or the operator's terminal 700.

FIG. 9 illustrates a user interface for displaying the VPN configuration reservation completion on the user's terminal 600 or the operator's terminal 700.

The user's terminal 600 or the operator's terminal 700 displays a screen including a setting schedule period and a reservation number, for example, on an appropriate output unit to allow notifying a user or an operator that configuration reservation related to the VPN (VPN configuration reservation) is completed.

Figure 10:
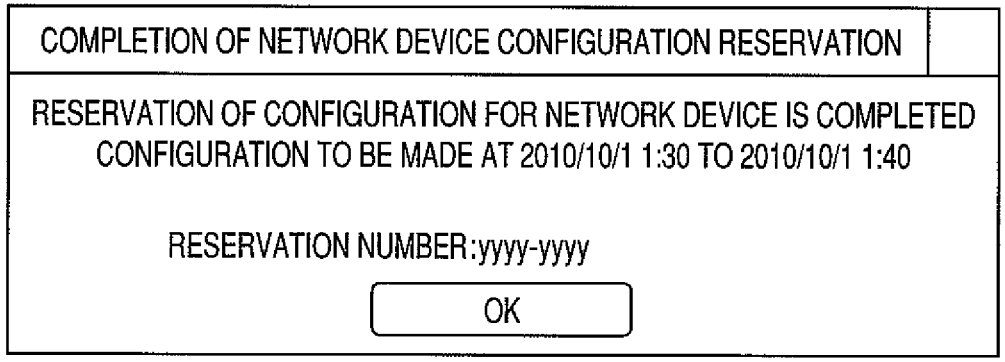
FIG. 10 illustrates a user interface for displaying the VPN configuration reservation completion on the operator's terminal 700.

FIG. 10 illustrates a user interface for displaying the VPN configuration reservation completion on the operator's terminal 700.

The operator's terminal 700 displays a screen including a setting schedule period and a reservation number, for example, on an appropriate output unit to allow notifying an operator that configuration reservation to the network device is completed.

Figure 11:
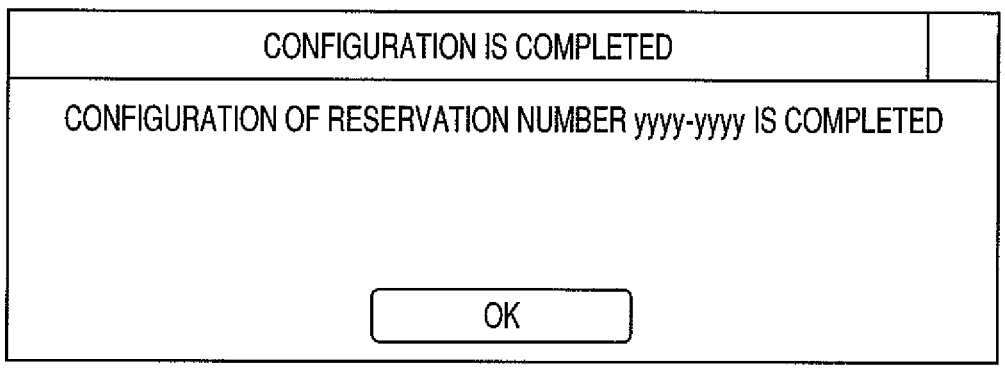
FIG. 11 illustrates a user interface for displaying the VPN configuration reservation completion on the user's terminal 600 or the operator's terminal 700.

FIG. 11 illustrates a user interface for displaying the VPN configuration reservation completion on the user's terminal 600 or the operator's terminal 700.

The user's terminal 600 or the operator's terminal 700 displays a screen including a message that setting is completed and a reservation number, for example, on an appropriate output unit to allow notifying a user or an operator that the setting of the VPN or the network device is completed.

[VPN Configuration Reservation and Configuration for Network Device]

Figure 12:
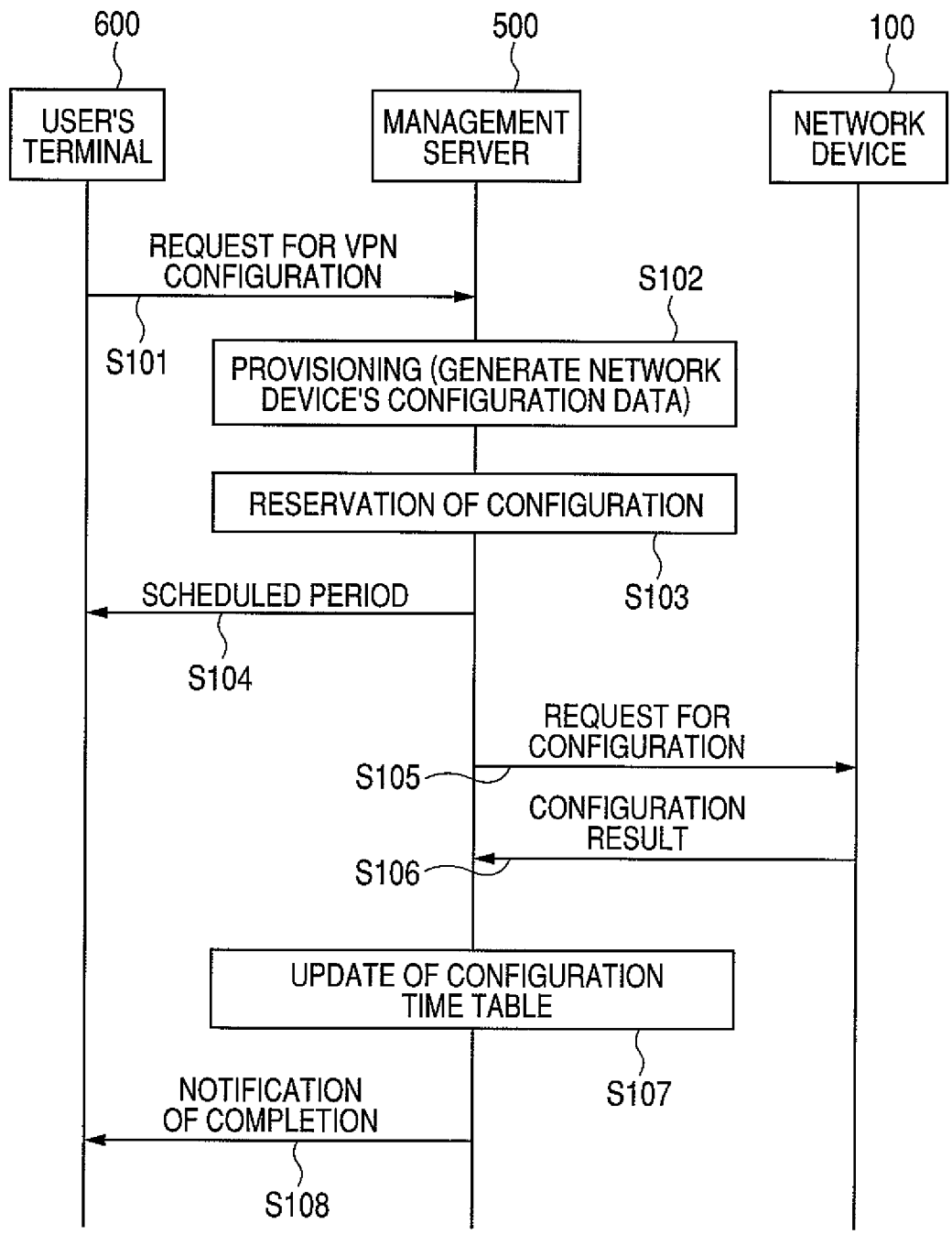
FIG. 12 illustrates a sequence diagram for VPN configuration reservation and processing for configuring the network device according to the present embodiment.

FIG. 12 illustrates a sequence diagram for VPN configuration reservation and processing for configuration to the network device according to the present embodiment. FIG. 13 is a table describing messages transmitted and received in VPN configuration reservation and processing for configuring the network device according to the present embodiment.

In the example of FIG. 12, although the user's terminal 600 transmits a VPN configuration request message to the management server 500, the operator's terminal 700 instead of the user's terminal 600 may transmit the VPN configuration request message to the management server 500.

In step S101, the management server 500 (hereinafter, CPU 550, for example) receives the VPN configuration request transmitted from the user's terminal 600. The message for the VPN configuration request includes a target VPN ID, a VPN configuration data, and a configuration desired time, for example, as illustrated in FIG. 13. For example, the VPN configuration data includes addition, deletion, and modification of ACL, addition, deletion, and modification of QoS, and addition, deletion, and change of user VLAN and is inputted using the user interface for inputting the VPN configuration data illustrated in FIG. 7. The VPN configuration request may include an appropriate identifier for identifying the content of setting. The management server 500 stores the time when it receives the VPN configuration request (receipt time 5242), the target VPN ID 5246 included in the VPN configuration request, the VPN configuration data 5243, and the configuration desired time 5244 in the VPN request table 524.

In step S102, the management server 500 identifies the network device 100 to which setting is made from the received VPN configuration request to create the content set to the network device 100 to which setting is made. In step S103, the management server 500 makes reservations for setting with reference to the configuration reservation table 522. For example, if another reservation is not duplicately made on the network device 100 to which setting is made, the management server 500 can make reservations for setting plural VPNs during the same period. The processing of design and configuration reservation is described in detail with reference to FIG. 14. After setting is reserved, the management server 500 notifies the user's terminal 600 of a scheduled period in step S104. A message telling the user's terminal 600 of the scheduled period includes a reservation result and the scheduled period during which setting is executed, for example.

The management server 500 starts configuration at a reserved time. Specifically, in step S105, the management server 500 transmits to the network device 100 to which setting is made a setting designation including a content set to the network device 100 to which setting is made. In step S106, the network device 100 notifies the management server 500 of a configuration result. The message telling the configuration result includes a configuration result which indicates whether the setting is successful, for example. In step S107, the management server 500 updates the processing time (sec) 5233 in the configuration time table 523 based on the time required for the configuration. The time required for the configuration may be a time passed from the transmission of the setting designation to the network device 100 to the reception of notification of the configuration result, for example. In addition to the above, an appropriate period related to the setting may be taken as the processing time. In step S108, the management server 500 notifies the user's terminal 600 that the setting is completed. The message telling the completion of the setting includes the configuration result similar to the configuration result message, for example.

Figure 14:
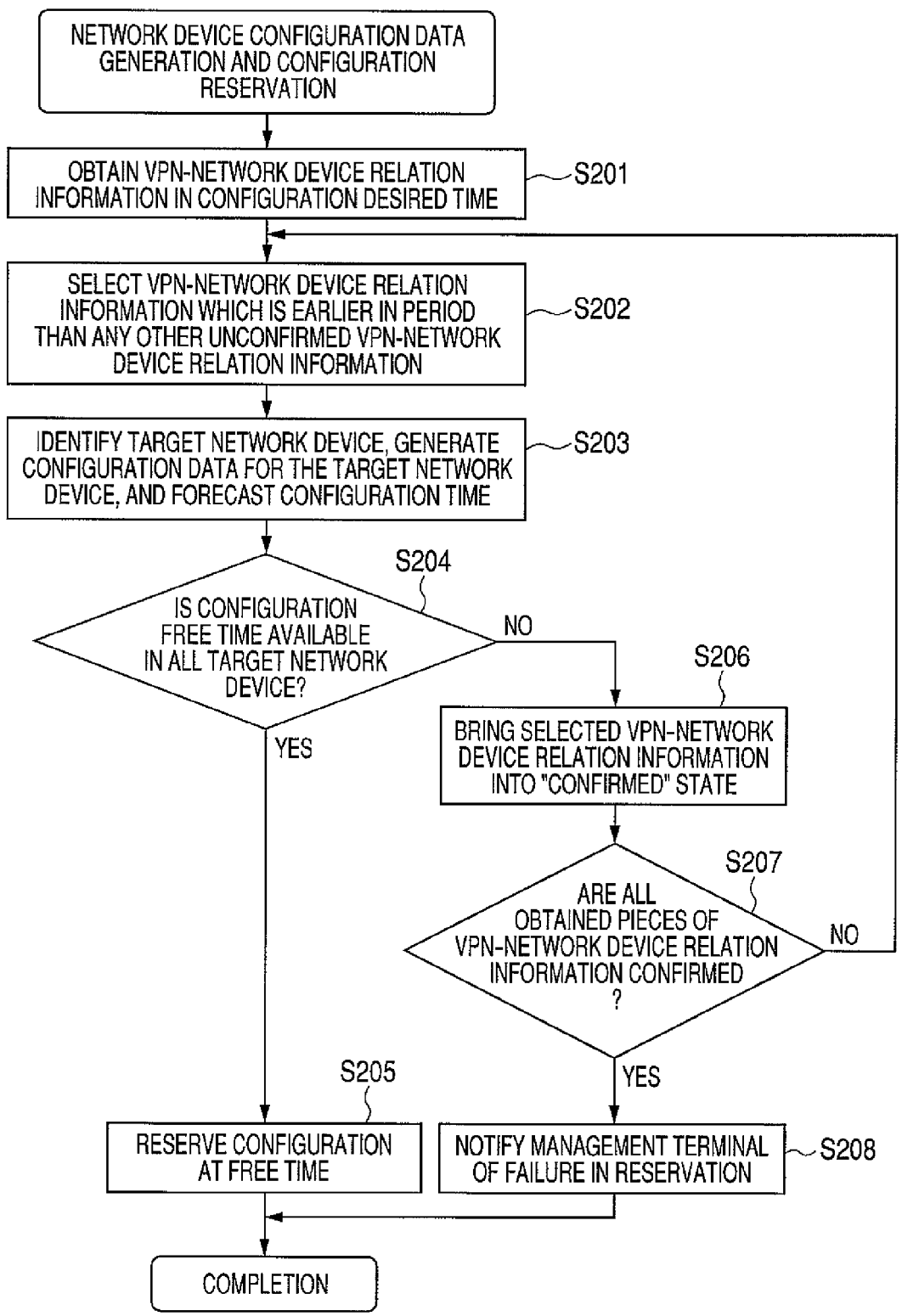
FIG. 14 is a flowchart for a network device configuration data generation and a configuration reservation processing according to the present embodiment.

FIG. 14 is a flow chart for a network device configuration data generation and a configuration reservation processing according to the present embodiment.

The management server 500 receives the VPN configuration request transmitted from the user's terminal 600 and then executes the present processing. The present processing corresponds to steps S102 to S103 illustrated in FIG. 12.

In step S201, the management server 500 obtains corresponding VPN-network device relation information (group of period, VPN ID, and the network device ID) based on target VPN ID and a configuration desired time included in the VPN configuration request with reference to the VPN-NW device relation table 521. For example, the management server 500 obtains the period 5211 including the configuration desired time, the VPN ID 5212 coinciding with the target VPN ID among the VPN IDs 5212 corresponding to each period 5211, and the corresponding network device ID 5213. If the configuration desired time is longer than the period of each item in the period 5211 of the VPN-NW device relation table 521, the management server 500 obtains plural pieces of the VPN-network device relation information.

In step S202, the management server 500 selects the VPN-network device relation information which is earlier in period than any other unconfirmed VPN-network device relation information. At this point, the management server 500 may store a "confirmed" flag in the memory 510 to determine whether VPN-network device relation information is unconfirmed correspondingly with each VPN-network device relation information obtained in step S201, for example. The "confirmed" flag is not set in an initial state (OFF), for example. If the "confirmed" flag corresponding to each VPN-network device relation information is not set, the management server 500 determines that the VPN-network device relation information is unconfirmed.

In step S203, the management server 500 identifies the network device 100 to which setting is made based on the network device ID in the selected VPN-network device relation information, generates configuration data for the network device 100 to which setting is made from the VPN configuration data included in the VPN configuration request, and forecasts processing time. The network device 100 to which setting is made does not always correspond to all of the network devices 100 indicated by the network device ID 5213 corresponding to the VPN ID 5212 depending on the item of the VPN configuration data, and may correspond to a part of the network device 100 among a relevant network device 100. The management server 500 obtains, for example, the network device ID 5213 of the identified target network device and the processing time (sec) 5233 of the corresponding configuration data with reference to the configuration time table 523 based on the configuration data for the network device. If the number of configuration data is plural target device times (sec) 5233 for each network device 100 is obtained, the management server 500 sums up the obtained processing time (sec) 5233 for each network device 100 to which setting is made to estimate the processing time for each network device 100 to which setting is made.

In step S204, the management server 500 determines whether free time for the estimated processing time is available with respect to the information on the target network device 5222 in the period of the selected VPN-network device relation information with reference to the configuration reservation table 522. For example, the management server 500 identifies the information on the target network device 5222 corresponding to the period with reference to the configuration reservation table 522 based on the period selected in step S202. The management server 500 determines whether free time for the processing time reserved at the same time zone is available with reference to the information on the target network device 5222 of the network device 100 to which setting is made identified in step S203 among the identified information of the target network device 5222. For example, a reservation ID is stored in addition to the free time. In step S205, if the free time is available, the management server 500 newly allocates the reservation ID to make reservations for setting to the free time and the processing is terminated. For example, the management server 500 stores the allocated reservation ID in the configuration reservation table 522 correspondingly with the period 5221 and each ID of the target network device. The management server 500 may store the reservation ID in the VPN request table 524 correspondingly with the request ID 5241 of the VPN configuration request.

In step S206, if the free time is not available, the management server 500 brings the selected VPN-network device relation information into a "confirmed" state. Specifically, for example, the management server 500 sets a flag on a "confirmed" flag corresponding to the selected VPN-network device relation information (to turn ON), which is brought into a "confirmed" state. In step S207, the management server 500 determines whether all the obtained pieces of VPN-network device relation information are confirmed. For example, the management server 500 determines whether the "confirmed" flag exists on the VPN-network device relation information to be turned OFF. In step S208, if all the obtained pieces of VPN-network device relation information are confirmed (or the "confirmed" flag does not exist on the VPN-network device relation information to be turned OFF), the management server 500 notifies the user's terminal 600 that reservation cannot be made.

In step S207, on the other hand, if unconfirmed (the "confirmed" flag is turned OFF) VPN-network device relation information exists, the processing returns to step S202 and the management server 500 repeats step S202 and the subsequent steps.

[Network Device Configuration and VPN Configuration Reservation Re-Generate]

One of characteristics of the present invention is that the VPN-NW device relation table 521 is updated to re-generate and re-reserve the already reserved VPN configuration reservation when the operator's terminal 700 notifies the management server 500 of the network device configuration request to cause the management server 500 to make the configuration reservation.

Figure 15:
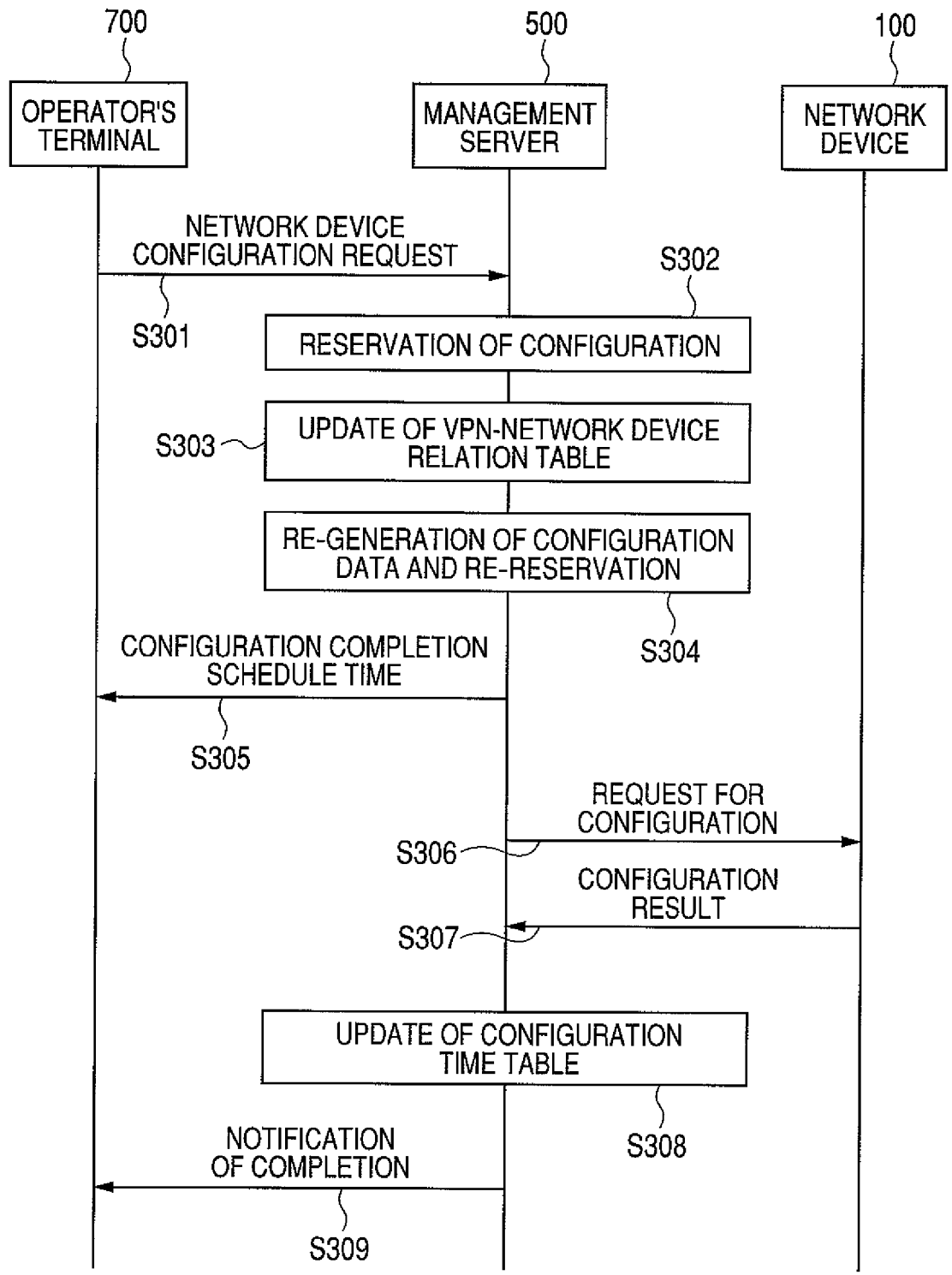
FIG. 15 illustrates a sequence diagram for the network device configuration reservation, re-generation and re-reservation for VPN configuration reservation, and configuration to the network device according to the present embodiment.

FIG. 15 illustrates a sequence diagram for the network device configuration reservation, re-generation and re-reservation for VPN configuration reservation, and configuration to the network device according to the present embodiment. Hereinafter, the configuration reservation regarding the network device 100 is referred to as "network device configuration reservation." FIG. 16 is a table describing messages transmitted and received in the network device configuration reservation, re-generation and re-reservation for VPN configuration reservation, and configuration to the network device according to the present embodiment.

In step S301, the management server 500 receives the network device configuration request informed from the operator's terminal 700. The message for the network device configuration request includes the ID of the target network device, the network device configuration data, and configuration desired time, for example, as illustrated in FIG. 16. The network device configuration data refers to "creation of VLAN in the apparatus," for example. As a result of setting "creation of VLAN in the apparatus," a corresponding relationship between the VPN and the network device 100 may be changed. In step S302, the management server 500 makes configuration reservation with reference to the configuration time table 523 and the configuration reservation table 522 based on the network device configuration data included in the received network device configuration request. For example, the configuration reservation is made as shown in the reservation ID=3 in FIG. 4.

In step S303, the management server 500 updates the VPN-NW device relation table 521. For example, the management server 500 updates the VPN-NW device relation table 521 based on the corresponding relationship between the VPN and the network device 100 changed by the requested network device setting. At this point, the management server 500 updates the VPN-network device relation information after the time for the configuration reservation or later.

In step S304, the management server 500 re-generates and re-reserves the already reserved VPN configuration reservation according to the updated VPN-network device relation information. Steps S302 to S304 are described in detail later with reference to FIG. 17. In step S305, the management server 500 notifies the operator's terminal 700 of setting completion schedule time after the configuration reservation. A message telling the configuration completion schedule time includes reservation results and the scheduled period, for example. The management server 500 may transmit a notification modifying the scheduled period including the VPN scheduled period according to a result of re-generation of the VPN configuration reservation to the user's terminal 600.

The management server 500 starts configuration at a reserved time. Specifically, in step S306, the management server 500 transmits configuration message including configuration data for the network device 100, to the target network device 100. In step S307, the network device 100 notifies the management server 500 of the configuration result. The message telling the configuration result includes a configuration result information which indicates whether the setting is successful, for example. In step S308, the management server 500 updates the configuration time table 523 based on the time required for the configuration. In step 309, the management server 500 notifies the operator's terminal 700 of the completion of the setting. The message telling the completion of the setting includes the configuration result similar to the message telling configuration result, for example.

Figure 17:
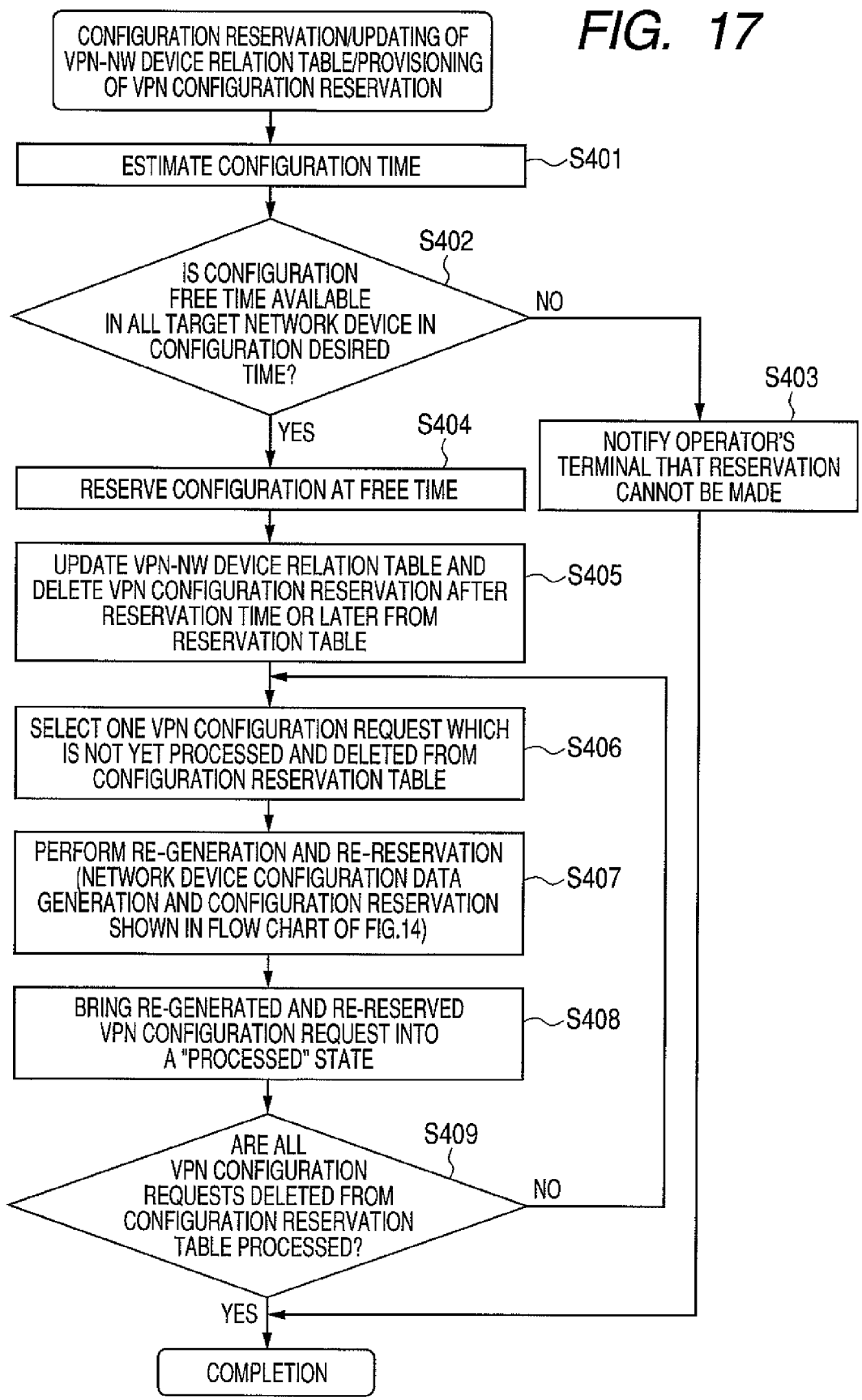
FIG. 17 is a flow chart for the configuration reservation processing of the network device 100, the updating processing for the VPN-NW device relation table 521, and the re-generation processing for the VPN configuration reservation according to the present embodiment.

FIG. 17 is a flow chart for the configuration reservation processing of the network device 100, the updating processing for the VPN-NW device relation table 521, and the re-generation processing for the VPN configuration reservation according to the present embodiment.

The management server 500 receives the NW configuration request from the operator's terminal 700 and then executes the present processing. The present processing corresponds to steps S302 to S304 illustrated in FIG. 15.

In step S401, the management server 500 refers to, the ID of the target network device 5231 and the configuration data 5232 in the configuration time table 523 based on the ID of the target network device and the network device configuration data included in the network device configuration request to obtain the processing time (sec) 5233 corresponding thereto, estimating the processing time for each ID of the target network device 5231. In step S402, the management server 500 refers to the period 5221 in the configuration reservation table 522 based on the configuration desired time included in the network device configuration request to determine whether free time for the estimated processing time is available in all the target network devices 100 in the corresponding information of the target network device 5222. As is the case with the above description, the management server 500 can determine whether free time is available depending on whether the reservation ID is stored in the corresponding information of the target network device 5222. In step S403, if free time is not available, the management server 500 notifies the operator's terminal 700 that the setting time cannot be obtained to be unable to reserve and the processing is terminated. In step S404, if free time is available, on the other hand, the management server 500 makes the configuration reservation during the free time. For example, the reservation ID is stored in the configuration reservation table 522.

In step S405, the management server 500 updates the VPN-NW device relation table 521 based on the corresponding relationship between the VPN and the network device 100 changed by the requested network device setting with respect to the VPN-network device relation information after the reserved time and deletes the VPN configuration reservation after the reserved time from the configuration reservation table 522. For example, if the configuring of the network device in which the network device ID=2, 3, and 4 corresponding to VPN ID=2 is modified to the network device ID=2, 3, and 5 is reserved in a period of 2008/09/05 01:20 to 2008/09/05, the management server 500 adds to the VPN-NW device relation table 521 an entry in which the period 5211 is "2008/09/05 01:20 to," VPN ID 5212 is "2," and the network device ID 5213 is "2, 3, and 5." For example, as illustrated in FIG. 3, the entry "2" of the VPN ID 5212 is changed. The management server 500 deletes the VPN configuration reservation after the reservation time of the network device setting from the configuration reservation table 522. For the deleted VPN Configuration reservation, the management server 500 sets a flag on the deleted flag 5248 of the same reservation ID as the reservation ID of the deleted VPN configuration reservation with reference to the reservation ID 5247 in the VPN request table 524.

In step S406, one VPN configuration request which is not yet processed and corresponds to the reservation ID deleted from the configuration reservation table 522 is selected from the VPN request table 524. The management server 500 selects an item in chronological order of the receipt time 5242 in the VPN request table 524, for example. If a flag is not set on the processed flag 5249 of each VPN configuration request, for example, it is determined that the VPN configuration request is not yet processed. If a flag is set on the deleted flag 5248, it can be determined that the VPN configuration request is the one deleted from the configuration reservation table 522. The management server 500 selects an item in chronological order of the receipt time 5242 in the VPN configuration request which meets the above conditions.

In step S407, the management server 500 re-generates and re-reserves the selected VPN configuration request. Specifically, the selected VPN configuration request corresponds, to the above received VPN configuration request and the management server 500 executes the network device configuration data generation and the configuration reservation processing illustrated in the flow chart in FIG. 14. In step S408, the management server 500 brings the re-generated and re-reserved VPN configuration request into a "processed" state. Specifically, for example, the management server 500 sets a flag on the processed flag 5249 corresponding to the re-generated and re-reserved. VPN configuration request to bring it into a "processed" state. In step S409, the management server 500 determines whether all the VPN configuration requests deleted from the configuration reservation table 522 are processed. For example, the management server 500 refers to the deleted flag 5248 and the processed flag 5249 in the VPN request table 524. If there is no VPN configuration request in which the deleted flag 5248 is set, but the Processed flag 5249 is not set, the management server 500 determines that all the VPN configuration requests are processed. If all the VPN configuration requests are not processed, the management server 500 returns to the processing in step S406 and repeats the subsequent processings. If all the VPN configuration requests are processed, on the other hand, the management server 500 terminates the processing. Another appropriate means may be used instead of the aforementioned flags.

The present invention is applicable to a network system forming a logical network such as a VPN, for example.

What is claimed is:

1. A management server in a network system in which a logical network is formed, the management server comprising:

a relation information storage unit configured to store a relationship between a first identifier of a logical network and second identifiers of a plurality of the transmission apparatuses forming the logical network;

a configuration reservation information storage unit configured to store a reservation information for each time zone and each transmission apparatus, the reservation information indicating whether the transmission apparatus is already reserved in the time zone or not reserved in the time zone;

a processing time storage unit which stores processing time relating to a third identifier of a configuration data information which is an item set to the transmission apparatus; and a processing unit, wherein the processing unit is configured to:

receive a first configuration request of a logical network from a user management terminal, the first configuration request including the first identifier and the third identifier, and execute reservation processing including:

obtaining the second identifiers from the relation information storage unit by referring to the relation information storage unit based on the first identifier;

obtaining, as an obtained processing time, a cumulative processing time needed for the first configuration request, by referring to the processing time storage unit based on the third identifier;

identifying a first time zone which satisfies the obtained processing time of every transmission apparatus corresponding to the second identifiers, by referring to the configuration reservation information storage unit;

making a reservation for the first time zone in the configuration reservation information storage unit; and transmitting a scheduled period notice including the first time zone to the user management terminal.

2. The management server according to claim 1, wherein the first configuration request for the logical network further includes the configuration data information, and wherein the management server is configured to transmit a setting designation according to the configuration data information included in the first configuration request to the transmission apparatus in the reserved said first time zone according to the reservation information stored in the configuration reservation information storage unit.

3. The management server according to claim 1, wherein the first configuration request of the logical network further includes a configuration desired time, and wherein the processing unit is configured to identify the first time zone indicating a vacancy of reservation information corresponding to the second identifiers of the plurality of transmission apparatuses in the configuration desired time.

4. The management server according to claim 1, wherein the processing unit is configured to:

obtain the processing time required to set the transmission apparatus according to the configuration data information, and store the obtained processing time in the processing time storage unit correspondingly with the third identifier of the configuration data information.

5. The management server according to claim 4, wherein the processing unit is configured to obtain a time during which the processing unit transmits the setting designation according to the configuration data information included in the first configuration request to the transmission apparatus and then receive notice of a configuration result from the transmission apparatus as the processing time.

6. The management server according to claim 1, wherein the processing unit is configured to:

receive the first configuration request for the transmission apparatus including the second identifiers of the plurality of transmission apparatuses and the configuration data information from an operator management terminal, refer to the configuration reservation information storage unit to identify a second time zone indicating a vacancy of reservation information corresponding to the second identifiers of the transmission apparatuses to set the reservation information corresponding to the second time zone and the second identifiers of the plurality of transmission apparatuses to a reserved information, update the first identifier of the logical network and the second identifiers of the plurality of the transmission apparatuses forming the logical network, in the relation information storage unit in accordance with the corresponding relationship between the first identifier of the logical network and the second identifiers of plurality of the transmission apparatuses which is changed by setting for the transmission apparatus, and execute again the reservation processing using the updated relation information storage unit with respect to the first configuration request of the logical network reserved after the second time zone or later in the configuration reservation information storage unit.

7. The management server according to claim 6, further comprising:

a configuration request information storage unit configured to store each information included in the first configuration request of the logical network as received from the user management terminal, wherein the processing unit deletes reservation information after the second time zone or later, and sequentially reads each piece of information included in the first configuration request of the logical network from the configuration request information storage unit to execute again the reservation processing.

8. The management server according to claim 6, wherein the management server transmits notice of changing the scheduled period notice including the first time zone obtained, by executing again the reservation processing to the user management terminal.

9. A network system which has a plurality of transmission apparatuses for transmitting a packet and a management server and forms a logical network including the transmission apparatus, wherein the management server includes:

a relation information storage unit configured to store a relationship between a first identifier of a logical network and second identifiers of a plurality of the transmission apparatuses forming the logical network;

a configuration reservation information storage unit configured to store a reservation information for each time zone and each transmission apparatus, the reservation information indicating whether the transmission apparatus is already reserved in the time zone or not reserved in the time zone;

a processing time storage unit which stores processing time relating to a third identifier of a configuration data information which is an item set to the transmission apparatus; and a processing unit, wherein the processing unit is configured to:

receive a first configuration request of a logical network from a user management terminal, the first configuration request including the first identifier and the third identifier, and execute reservation processing including:

obtaining the second identifiers from the relation information storage unit by referring to the relation information storage unit based on the first identifier;

obtaining, as an obtained processing time, a cumulative processing time needed for the first configuration request, by referring to the processing time storage unit based on the third identifier;

identifying a first time zone which satisfies the obtained processing time of every transmission apparatus corresponding to the second identifiers, by referring to the configuration reservation information storage unit;

making a reservation for the first time zone in the configuration reservation information storage unit; and transmitting a scheduled period notice including the first time zone to the user management terminal.

10. The network system according to claim 9, wherein the processing unit is configured to:

receive the first configuration request for the transmission apparatus including the second identifiers of the plurality of transmission apparatuses and the configuration data information from an operator management terminal, refer to the configuration reservation information storage unit to identify a second time zone indicating a vacancy of reservation information corresponding to the second identifiers of the transmission apparatuses to set the reservation information corresponding to the second time zone and the second identifiers of the plurality of transmission apparatuses to a reserved information, update the first identifier of the logical network and the second identifiers of the plurality of the transmission apparatuses forming the logical network, in the relation information storage unit in accordance with the corresponding relationship between the first identifier of the logical network and the second identifiers of plurality of the transmission apparatuses which is changed by setting for the transmission apparatus, and execute again the reservation processing using the updated relation information storage unit with respect to the first configuration request of the logical network reserved after the second time zone or later in the configuration reservation information storage unit.

11. A configuration scheduling method for scheduling a setting of a logical network in a network system, which has both a plurality of transmission apparatuses for transmitting a packet and a management server, the method comprising:

storing, in a relation information storage unit, a relationship between a first identifier of the logical network and second identifiers of a plurality of the transmission apparatuses forming the logical network;

storing, in a configuration reservation information storage unit, a reservation information for each time zone and each transmission apparatus, the reservation information indicating whether the transmission apparatus is already reserved in the time zone or not reserved in the time zone;

storing, in a processing time storage unit, processing time relating to a third identifier of a configuration data information which is an item set to the transmission apparatus; and executing, via a processing unit, operations including:

receiving a first configuration request of a logical network from a user management terminal, the first configuration request including the first identifier and the third identifier, and executing reservation processing including operations of:

obtaining the second identifiers from the relation information storage unit by referring to the relation information storage unit based on the first identifier;

obtaining, as an obtained processing time, a cumulative processing time needed for the first configuration request, by referring to the processing time storage unit based on the third identifier;

identifying a first time zone which satisfies the obtained processing time of every transmission apparatus corresponding to the second identifiers, by referring to the configuration reservation information storage unit;

making a reservation for the first time zone in the configuration reservation information storage unit; and transmitting a scheduled period notice including the first time zone to the user management terminal.

12. The configuration scheduling method according to claim 11, comprising:

executing, via the processing unit, operations including:

receiving the first configuration request for the transmission apparatus including the second identifiers of the plurality of transmission apparatuses and the configuration data information from an operator management terminal, referring to the configuration reservation information storage unit to identify a second time zone indicating a vacancy of reservation information corresponding to the second identifiers of the transmission apparatuses to set the reservation information corresponding to the second time zone and the second identifiers of the plurality of transmission apparatuses to a reserved information, updating the first identifier of the logical network and the second identifiers of the plurality of the transmission apparatuses forming the logical network, in the relation information storage unit in accordance with the corresponding relationship between the first identifier of the logical network and the second identifiers of plurality of the transmission apparatuses which is changed by setting for the transmission apparatus, and executing again the reservation processing using the updated relation information storage unit with respect to the first configuration request of the logical network reserved after the second time zone or later in the configuration reservation information storage unit.

* * * * *